H. W. SECOR.
TESTING INSTRUMENT.
APPLICATION FILED JAN. 11, 1910.
1,000,300.
Patented Aug. 8, 1911.
2 SHEETS—SHEET 2.
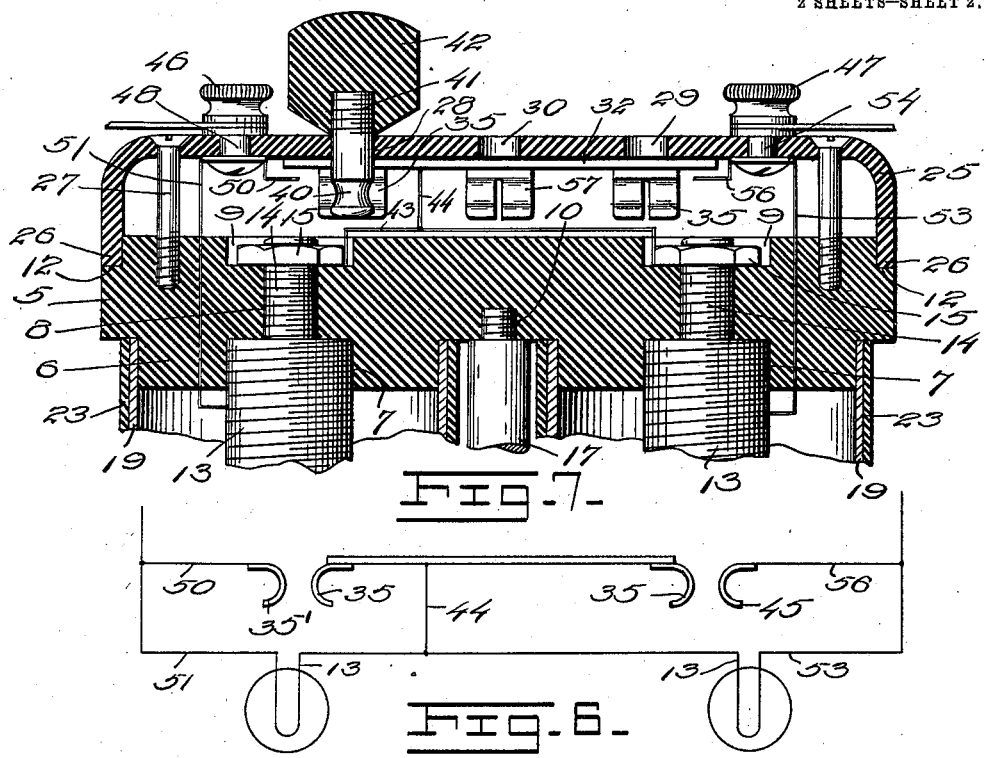
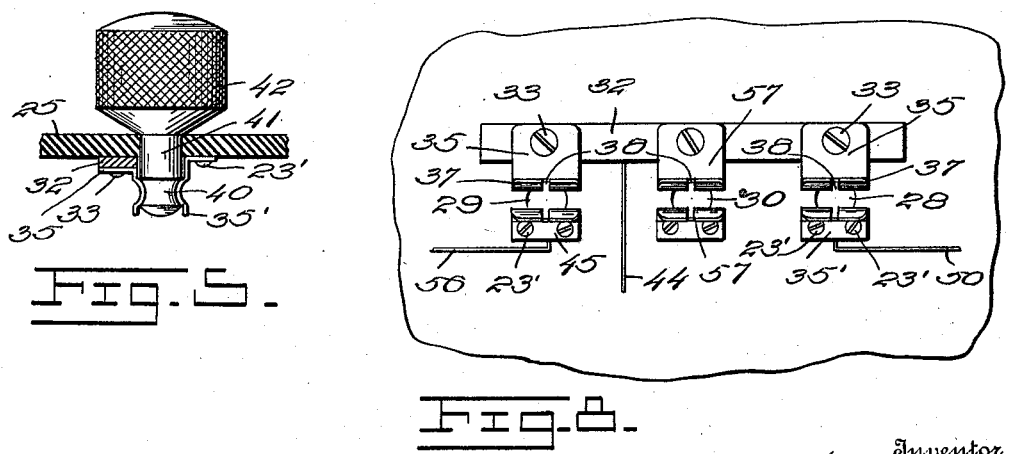
Witnesses
Inventor
H. W. Secor,
By
Attorneys

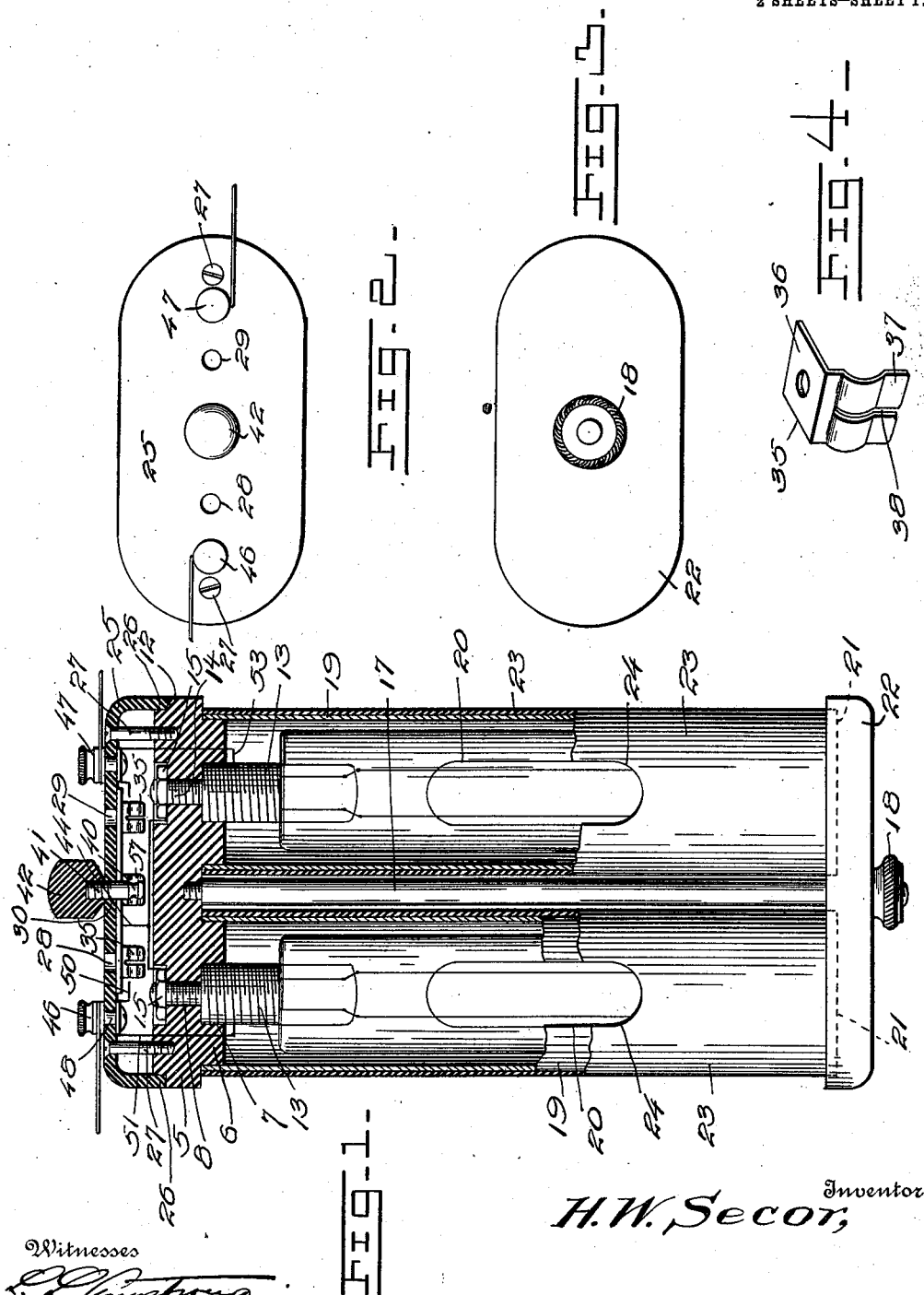

UNITED STATES PATENT OFFICE.

HARRY W. SECOR, OF TRENTON, NEW JERSEY.

TESTING INSTRUMENT.

1,000,300.  Specification of Letters Patent.  Patented Aug. 8, 1911.

Application filed January 11, 1910. Serial No. 537,411.

*To all whom it may concern:*

Be it known that I, HARRY W. SECOR, a citizen of the United States, residing at Trenton, in the county of Mercer and State of New Jersey, have invented certain new and useful Improvements in Testing Instruments, of which the following is a specification.

This invention relates to certain new and useful improvements in testing instrument.

The object of my invention is to provide a light, portable comparing and testing instrument to be brought into an electric circuit so that an electric light may be accurately compared and tested with the standard lamp, to determine the illuminating power of said light or attached lamp.

With the above and other objects in view, the present invention consists in the combination and arrangement of parts as will be hereinafter more fully described and particularly pointed out in the appended claims, it being understood that changes in the specific structure shown and described may be made within the scope of the claims without departing from the spirit of the invention.

In the drawings forming a part of this specification, and in which like numerals of reference indicate similar parts in the several views, Figure 1 shows an elevational view of a test lamp set embodying my invention, with parts broken away. Fig. 2 is a top view. Fig. 3 is a bottom view. Fig. 4 shows a large detached perspective view of one of the jack springs. Fig. 5 shows a large view disclosing one of the jack plugs in contact with the jack springs. Fig. 6 shows a wiring diagram. Fig. 7 shows an enlarged fragmentary portion of the base plate and cap. Fig. 8 shows a bottom view of the cap disclosing the arrangement of the jack springs.

In the accompanying drawings the numeral 5 designates an oblong base member having rounded ends made of suitable non-conducting material, one face of which is provided with the annular bosses 6, each boss having a seat 7 an aperture 8 and a socket 9, as clearly shown in Fig. 7. At a point between the two bosses I provide the threaded aperture 10, the edge opposite the bosses is provided with a rabbet 12. Held within the seat 7, is the socket 13 into which is screwed an incandescent electric lamp of any approved construction said socket having a projecting threaded stem 14 upon which is carried the securing nut 15. As shown, each stem 14 is held within one of the apertures 8, while the nuts are held within the sockets 9. Extending from the threaded opening 10, is the connecting rod 17, which rod, at its lower end carries the thumb nut 18. Held upon each boss 6, is a metal tube 19, having a lengthwise positioned slot 20. These tubes at their lower end being held within the sockets 21 of the end plate 22. The rod 17 extends through this end plate 22, the thumb nut 18 holding this plate against the tubes 19. Revolubly held above each tube 19, is a tubular shield 23, made of fiber or other suitable material, the sleeves also having registering slots 24 for coaction with the slots within the tube. The metal tubes 19 serve as housings for the lamps, while the sleeves serve as shields in that they may be rotated to cover the slot within the tube, thereby protecting the incased lamps. Removably held to the base 5 is a cap 25 made of fiber or other suitable non-conducting material, the lower edge 26 of which rests within the rabbet 12, this cap being secured to the base by means of the screws 27. Passing through this cap 25 are the jack holes 28, 29 and 30, while centrally held within the upper face of the cap is the jack bar 32, of suitable conducting material. In Fig. 8 I show a bottom view of the jack bar 32 which extends entirely through the cap, and at each end has a screw 33, by means of which a jack spring 35 may be secured to this bar 32.

As shown in Fig. 4, the jack spring comprises a flat securing base 36, from which base extends at right angles the spring forming member 37, which is slotted as shown at 38 and outwardly curved to form a snug union with the collar 40 of the jack plug 41 carrying the insulated handle 42, as shown in Fig. 5. Secured to each lamp stem 14 forming one terminal of the lamp is the electric conductor 43, this conductor, by means of the branch 44 being brought into circuit with the metal jack bar 32. These jack springs 35 are held proximal to the jack holes 28 and 29. Opposite each jack spring 35 is a similar jack spring 35′ and 45, as shown in the wiring diagram. These jack springs 35′ or 45, by means of suitable screws 23′ are held to the under surface of the cap 25 and are similar in construction to the jack springs 35. Held upon the cap 25 proximal to the plug openings 28 and 29, are the binding posts 46 and 47, and extending from the stem 48, of the post 46, is the electric conductor 50, connected to the jack spring 35', while the remaining end 51 of this conductor is secured to the neck 13 of the lamp adjacent this end, and forming a lamp terminal. Extending from the opposite lamp socket 13 is the conductor 53, which is led to the binding post stem 54 of the binding post 47. The opposite end 56 of this conductor being secured to the jack spring 45. Held adjacent to the plug opening 30 are two jack springs 57, which are not in circuit and within which the jack plug 41 is normally held. When the instrument is brought into circuit, both lamps will glow. If, however, the jack plug is in circuit within the openings 29, a contact will be formed between the springs 35 and 45 cutting out the lamp upon that side while, inserting the plug into the opening 28, contact is formed between the jack spring 35' and 35 cutting out the lamp upon that side.

The device is simple and inexpensive in construction and both durable and efficient in operation.

Having thus described my said invention, what is claimed is:—

1. The combination in a device of the character described, of a non-conducting base having a seat and connected aperture at each end, sockets having stems for coaction with said seat and aperture respectively, incandescent lamps engaging in said sockets, a conducting bar carrying a jack spring at each end, a cap, two jack springs carried by said cap adjacent said first mentioned springs, an electric conductor connecting one terminal of said lamps and contacting with said bar, and two electric conductors each secured to one of said base jack springs and the remaining terminal of one lamp.

2. The combination with a base made of insulating material, of two incandescent electric lamps, a cap secured to said base having oppositely positioned plug openings, a bar carried by said cap having a jack spring at each end proximal to said plug openings, a jack spring adjacent to each of said bar springs, and an electric conductor extending from said bar to each of said lamps, an electric conductor extending from each of said last mentioned jack springs and connected to a lamp, and an electric conductor extending from each of said last mentioned conductors.

3. The combination with a base made of insulating material, of two incandescent electric lamps, a cap secured to said base having oppositely positioned plug openings, a bar carried by said cap having a jack spring at each end proximal to said plug openings, a jack spring adjacent to each of said first mentioned springs, an electric conductor extending from said bar to each of said lamps, an electric conductor extending from each of said last mentioned jack springs and connected to a lamp, an electric conductor extending from each of said last mentioned conductors and a plug arranged to be brought into contact with said springs.

4. In combination, a non-conducting base having two projecting annular bosses, each with a seat, an incandescent lamp in each seat, a connecting rod extending from said base, an end plate carried by said rod having two sockets registering with said bosses, a slotted tube extending from each boss to a socket, a slotted sleeve revolubly held upon each tube, a non-conducting cap secured to said base having two plug openings, a jack bar of conducting material carried by said cap having a spring at each end proximal to said openings, a conductor extending from said bar to each of said lamps, a jack spring secured to said cap opposite each said first mentioned spring, an electric conductor extending from each of said jack springs to each of said lamps, and an electric terminal extending from each last mentioned conductor.

In testimony whereof I affix my signature, in presence of two witnesses.

HARRY W. SECOR.

Witnesses:
 HARRY S. LEWIS,
 ABRAM D'A. NAAR.

---

Copies of this patent may be obtained for five cents each, by addressing the "Commissioner of Patents, Washington, D. C."